US011939798B2

(12) United States Patent
Kimura et al.

(10) Patent No.: US 11,939,798 B2
(45) Date of Patent: Mar. 26, 2024

(54) OPENING AND CLOSING DEVICE FOR VEHICLE SLIDING DOOR

(71) Applicant: MITSUI KINZOKU ACT CORPORATION, Yokohama (JP)

(72) Inventors: Shuntaro Kimura, Kanagawa (JP); Naoki Hanaki, Kanagawa (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 274 days.

(21) Appl. No.: 17/142,728

(22) Filed: Jan. 6, 2021

(65) Prior Publication Data

US 2021/0214977 A1 Jul. 15, 2021

(30) Foreign Application Priority Data

Jan. 11, 2020 (JP) ................................ 2020-003279

(51) Int. Cl.
*E05B 83/40* (2014.01)
*E05B 77/26* (2014.01)
(Continued)

(52) U.S. Cl.
CPC .............. *E05B 83/40* (2013.01); *E05B 77/26* (2013.01); *E05B 81/16* (2013.01); *E05B 81/20* (2013.01);
(Continued)

(58) Field of Classification Search
CPC .......... E05B 81/20; E05B 81/21; E05B 83/40; E05B 81/16; E05B 81/14; E05B 77/26;
(Continued)

(56) References Cited

U.S. PATENT DOCUMENTS 4,948,183 A * 8/1990 Yamada .................. E05B 81/06 292/201
5,564,761 A * 10/1996 Mizuki ................... E05B 81/20 292/201
(Continued)

FOREIGN PATENT DOCUMENTS

JP 11303483 A * 11/1999 ............ E05B 81/20
JP 2016-030982 A 3/2016
JP 2019112766 A * 7/2019 ............ E05B 81/16

OTHER PUBLICATIONS

Espacenet, machine translation of JPH11303483A, generated Jan. 24, 2023 (Year: 2023).*

*Primary Examiner* — Kristina R Fulton
*Assistant Examiner* — Emily G. Brown
(74) *Attorney, Agent, or Firm* — Foley & Lardner LLP

(57) ABSTRACT

An opening and closing device for a vehicle sliding door, including: a latch; a ratchet; a power closer; a closing lever configured to rotate the latch in a closing direction from a half latched position to a fully latched position, by being rotated by motor power of the power closer; a cancel lever configured to shift between: a coupling position where rotation of the closing lever is transmitted to the latch; and a cancel position where rotation of the closing lever is not transmitted to the latch; and a first lever and a second lever configured to move the cancel lever from the coupling position to the cancel position by operation of an operating handle of a sliding door, wherein the cancel lever includes a non-flat reinforced contacting part to which the first lever and the second lever are independently configured to brought into contact.

8 Claims, 6 Drawing Sheets

(51) Int. Cl.
*E05B 81/16* (2014.01)
*E05B 81/20* (2014.01)
*E05B 81/36* (2014.01)

(52) U.S. Cl.
CPC ......... *E05B 81/36* (2013.01); *E05Y 2201/412* (2013.01); *E05Y 2201/68* (2013.01); *E05Y 2201/712* (2013.01)

(58) Field of Classification Search
CPC .......... E05B 85/10; E05B 77/24; E05B 77/20; E05B 77/245
See application file for complete search history.

(56) References Cited

U.S. PATENT DOCUMENTS

| | | | | |
|---|---|---|---|---|
| 5,893,593 | A * | 4/1999 | Dowling | E05B 83/36<br>292/216 |
| 6,135,513 | A * | 10/2000 | Hamada | E05B 81/20<br>292/201 |
| 6,382,686 | B1 * | 5/2002 | Ishigaki | E05B 81/20<br>292/201 |
| 8,061,742 | B2 * | 11/2011 | Machida | E05B 83/40<br>292/201 |
| 2005/0023840 | A1 * | 2/2005 | Fukunaga | E05B 81/34<br>292/201 |
| 2008/0022736 | A1 * | 1/2008 | Kouzuma | E05B 81/20<br>70/237 |
| 2014/0001771 | A1 * | 1/2014 | Shibayama | E05B 81/14<br>292/108 |
| 2016/0032630 | A1 | 2/2016 | Machida et al. | |
| 2019/0136588 | A1 * | 5/2019 | Nagaoka | B60J 5/04 |
| 2020/0248486 | A1 * | 8/2020 | Okuyama | E05B 79/08 |
| 2022/0195757 | A1 * | 6/2022 | Kejdana | E05B 85/26 |

* cited by examiner

OPENING AND CLOSING DEVICE FOR VEHICLE SLIDING DOOR

CROSS-REFERENCE TO RELATED APPLICATION(S)

The present application claims priority to and incorporates by reference the entire contents of Japanese Patent Application No. 2020-003279 filed in Japan on Jan. 11, 2020.

BACKGROUND

The present disclosure relates to an opening and closing device for a vehicle sliding door.

A sliding door of a vehicle is often provided with a power closing mechanism that moves a sliding door from a half latched state to a fully latched state by the motor power. The power closing mechanism is able to close the sliding door in a comfortable manner, by rotating the latch of the full-closing rear latch mechanism in the closing direction, from a half latched position (or the vicinity thereof) to a fully latched position (or the overstroke position) by the motor power.

When the sliding door moves from the door opening position to the half latched position, the power closing mechanism is activated based on a signal or the like from the center, a switch, or the like, and rotates the latch in the closing direction (full latch direction).

The power closing mechanism (including its power transmission path) includes a cancel mechanism that stops the closing operation when an abnormality occurs while the closing operation is taking place. The cancel mechanism is operated automatically and manually. In general, when the cancel mechanism is to be operated manually, the closing operation is cancelled by operating an operating handle (outer handle or inner handle) of a door (Japanese Patent Application Laid-open No. 2016-030982).

The cancel mechanism disclosed in Japanese Patent Application Laid-open No. 2016-030982 includes a closing lever that rotates a latch in the closing direction by the power of the power closing mechanism; a cancel lever that moves between a coupling position where the latch can be rotated in the closing direction by a closing lever, and a cancel position where the rotation of the latch in the closing direction is disabled; a first lever that is able to move the cancel lever from the coupling position to the cancel position by operation of the handle of the door; and a second lever that is able to similarly move the cancel lever from the coupling position to the cancel position by operation of the handle of the door.

In the cancel mechanism disclosed in Japanese Patent Application Laid-open No. 2016-030982, the cancel lever is moved to the cancel position, by bringing a first pressing part of the first lever or a second pressing part of the second lever into contact with a contacting piece of the cancel lever, according to the circumstances. However, because three levers including the cancel lever, the first lever, and the second lever are pivotally supported on a single common shaft, the first pressing part and the second pressing part need to be placed so as not to interfere with each other. Consequently, in Japanese Patent Application Laid-open No. 2016-030982, the first pressing part and the second pressing part are shifted in the radial direction of the common shaft.

In this manner, when the distance of the first pressing part and the second pressing part from the common shaft is shifted, as illustrated in FIG. 7 in Japanese Patent Application Laid-open No. 2016-030982, the contacting piece of the cancel lever is formed into a flat contacting piece that is elongated in the radial direction of the common shaft. When the contacting piece is flat, the resistance and strength against the pressing force applied from the first pressing part and the second pressing part is deteriorated, and the contacting piece may be deformed in the pressing direction.

Moreover, in the cancel mechanism disclosed in Japanese Patent Application Laid-open No. 2016-030982, the three members including the common shaft, the contacting piece of the cancel lever, and the closing shaft to which the closing lever is pivotally supported are arranged in a substantially straight line. Thus, a distance between the common shaft and the closing shaft is increased, thereby increasing the size of the cancel mechanism.

In addition to the increase of distance between the common shaft and the closing shaft, a swinging space (movable space) for the closing lever and a swinging space (movable space) for the cancel lever are provided at the side portion thereof. Consequently, the size of the cancel mechanism is further increased.

SUMMARY

In some embodiments, an opening and closing device for a vehicle sliding door according to the present disclosure includes: a latch configured to engage with a striker provided on a vehicle body; a ratchet configured to engage with the latch so as to maintain engagement of the latch with the striker; a power closer including a motor; a closing lever configured to rotate the latch in a closing direction from a half latched position to a fully latched position, by being rotated by motor power of the power closer; a cancel lever configured to shift between: a coupling position where rotation of the closing lever is transmitted to the latch; and a cancel position where rotation of the closing lever is not transmitted to the latch; and a first lever and a second lever configured to move the cancel lever from the coupling position to the cancel position by operation of an operating handle of a sliding door, wherein the cancel lever includes a non-flat reinforced contacting part to which the first lever and the second lever are independently configured to brought into contact.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Preferred embodiments of an opening and closing device for a vehicle sliding door according to the present disclosure will be described in detail with reference to the accompanying drawings. The opening and closing device explained in the embodiments includes a full-closing latch mechanism that maintains a sliding door in a door-closed state, a full-opening latch mechanism that keeps the sliding door in a door-opened state, a releasing mechanism that releases the sliding door from the door-closed state, a releasing mechanism that releases the sliding door from the door-opened state, a safety lock that restricts the function of the releasing mechanism, and the like.

Figure 1:
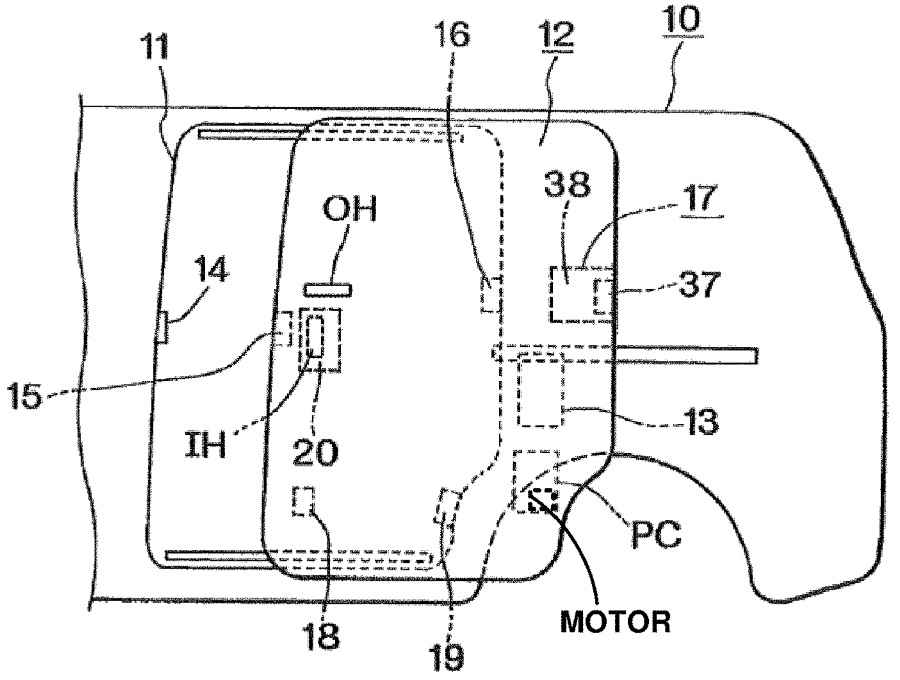
FIG. 1 is a schematic side view of a vehicle body and a sliding door provided with an opening and closing device for a vehicle sliding door according to the present disclosure.

FIG. 1 illustrates a side surface of a vehicle provided with an opening and closing device. The vehicle includes a vehicle body 10, a door opening part 11 of the vehicle body 10, and a sliding door 12 slidably attached to the vehicle body 10. The sliding door 12 slides in a door closing direction toward the front and a door opening direction toward the rear by the power of a power sliding mechanism 13 disposed on the vehicle body 10 or the sliding door 12.

A front striker 14 is provided on the front edge part of the door opening part 11 of the vehicle body 10. A full-closing front latch mechanism 15 (hereinafter, may be abbreviated as a front latch mechanism 15 or a full-closing latch mechanism 15) that maintains the sliding door 12 in the door-closed state by engaging with the front striker 14, is provided on the front end of the sliding door 12. A rear striker 16 is provided on the rear edge part of the door opening part 11 of the vehicle body 10. A full-closing rear latch mechanism 17 (hereinafter, may be abbreviated as a rear latch mechanism 17, or a full-closing latch mechanism 17) that maintains the sliding door 12 in the door-closed state by engaging with the rear striker 16, is provided on the rear end of the sliding door 12. As is well known, the full-closing latch mechanisms 15 and 17 each include a latch and a ratchet. Moreover, the full-closing latch mechanisms 15 and 17 maintain the sliding door 12 in a normal door-closed state by cooperating with each other.

Furthermore, as illustrated in FIG. 1, a full-opening latch mechanism 18 including a known latch and ratchet mechanism is provided on the sliding door 12. When the sliding door 12 is moved to a predetermined fully opened position by sliding in the opening direction, the full-opening latch mechanism 18 maintains the sliding door 12 at the fully opened position, by engaging with a full-opening striker 19 attached to the vehicle body 10.

An outer handle OH is provided on the exterior surface of the sliding door 12. An inner handle IH is provided on the interior surface of the sliding door 12. Hereinafter, when there is no need to distinguish between the outer handle OH and the inner handle IH, the outer handle OH and the inner handle IH will be referred to as an "operating handle". The operation force applied to the outer handle OH and the inner handle IH is transmitted to the full-closing front latch mechanism 15, the full-closing rear latch mechanism 17, and the full-opening latch mechanism 18 via a mechanical coupling means (a Bowden cable and the like). The mechanical coupling means is arranged via a relay mechanism 20 inside the sliding door 12.

The full-closing rear latch mechanism 17 includes a rear latch unit 37 that engages with the rear striker 16, and an operation unit 38.

Figure 2:
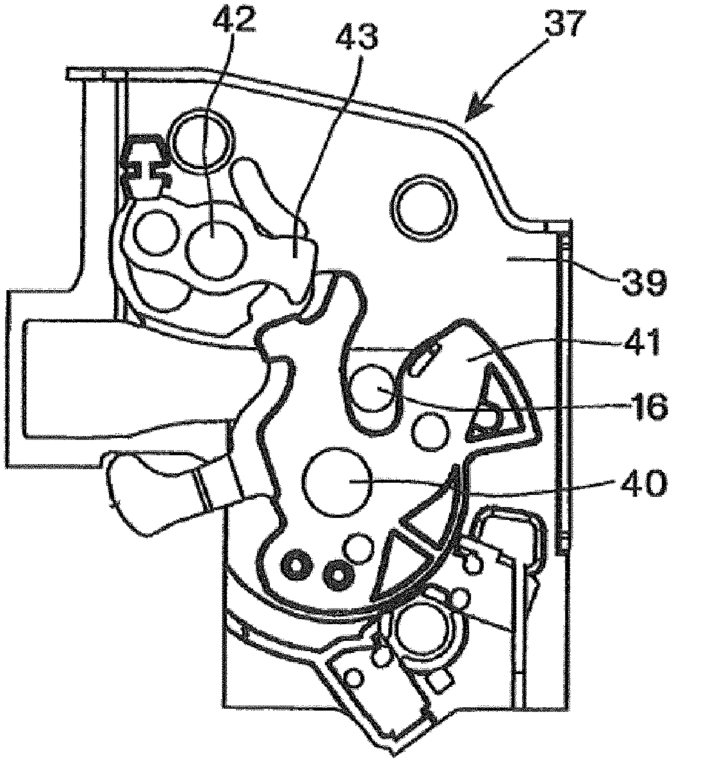
FIG. 2 is a front view of a rear latch unit of a full-closing rear latch mechanism of the opening and closing device.

As illustrated in FIG. 2, the rear latch unit 37 includes a latch body 39 formed of synthetic resin and the like. A latch 41 is pivotally supported to the latch body 39 by a latch shaft 40, and a ratchet 43 is pivotally supported to the latch body 39 by a ratchet shaft 42. When the sliding door 12 is moved in the door closing direction, the latch 41 at the unlatched position is brought into contact with the rear striker 16 of the vehicle body 10, and is rotated in the closing direction to the fully latched position (to be precise, the overstroke position) through the half latched position. As is well known, by engaging with the latch 41, the ratchet 43 maintains the engagement state between the latch 41 and the rear striker 16, and maintains the sliding door 12 in the door-closed state. The latch 41 in FIG. 2 is at the fully latched position. The latch 41 is biased in the counterclockwise rotation direction (unlatch direction) by a latch spring (not illustrated). The ratchet 43 is biased in the clockwise rotation direction (latch engaging direction) by a ratchet spring (not illustrated), and is engaged with the latch 41.

Figure 3:
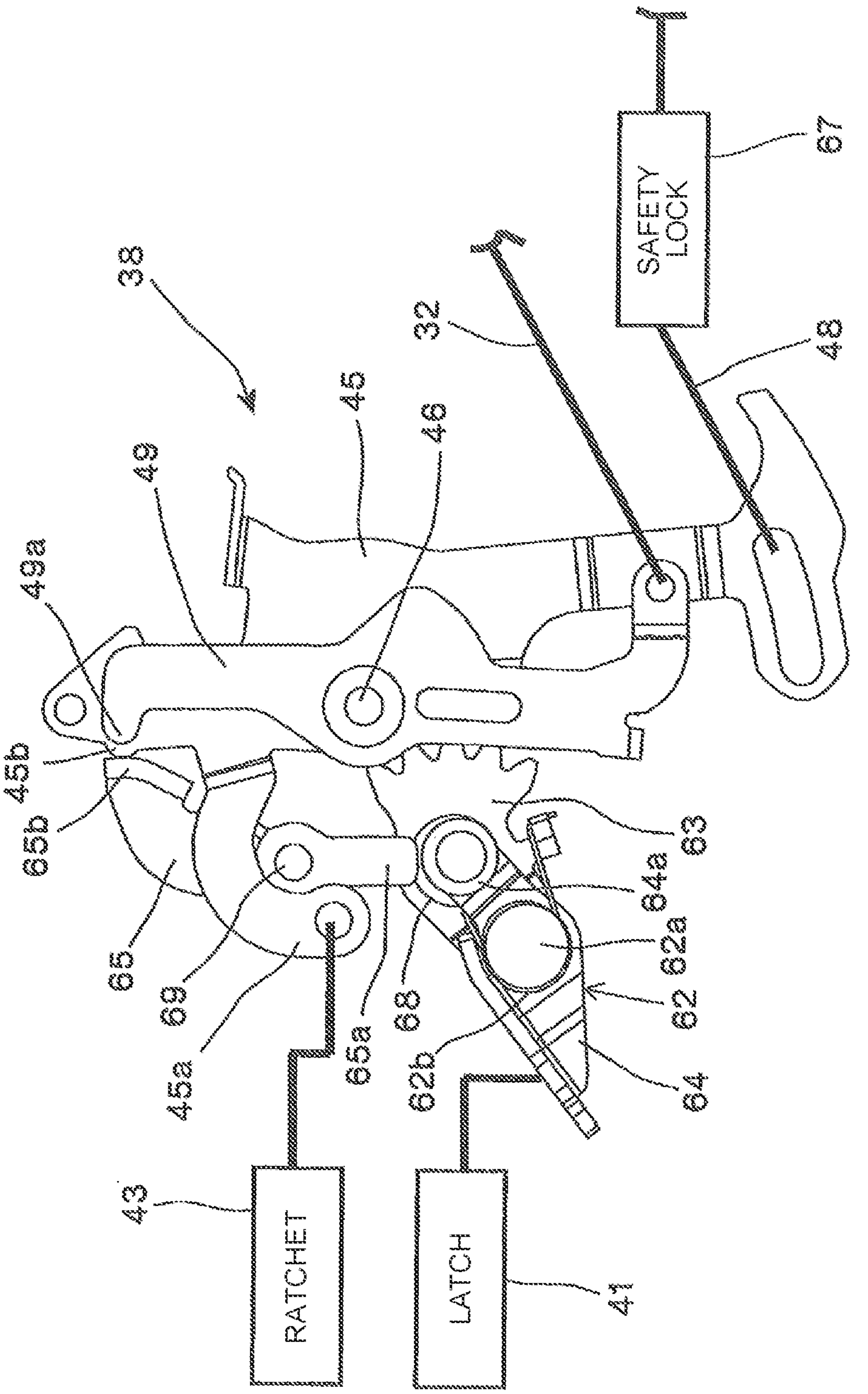
FIG. 3 is a side view illustrating an internal structure of an exterior side of an operation unit of the full-closing rear latch mechanism.
Figure 4:
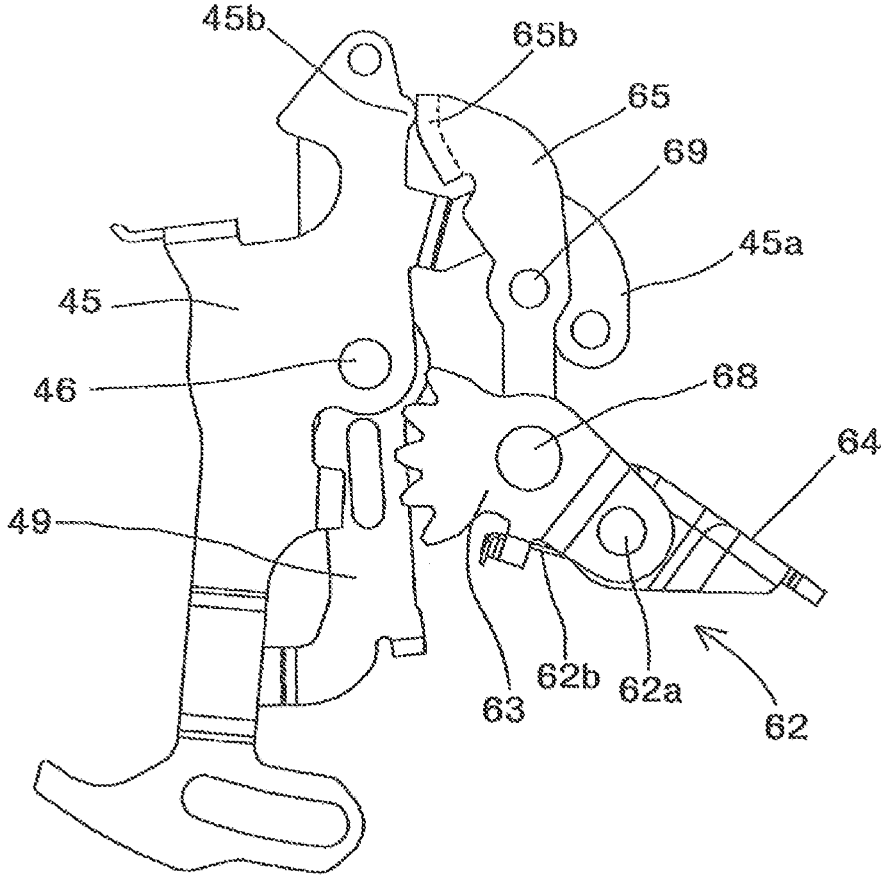
FIG. 4 is a side view illustrating an internal structure of an interior side of the operation unit.
Figure 5:
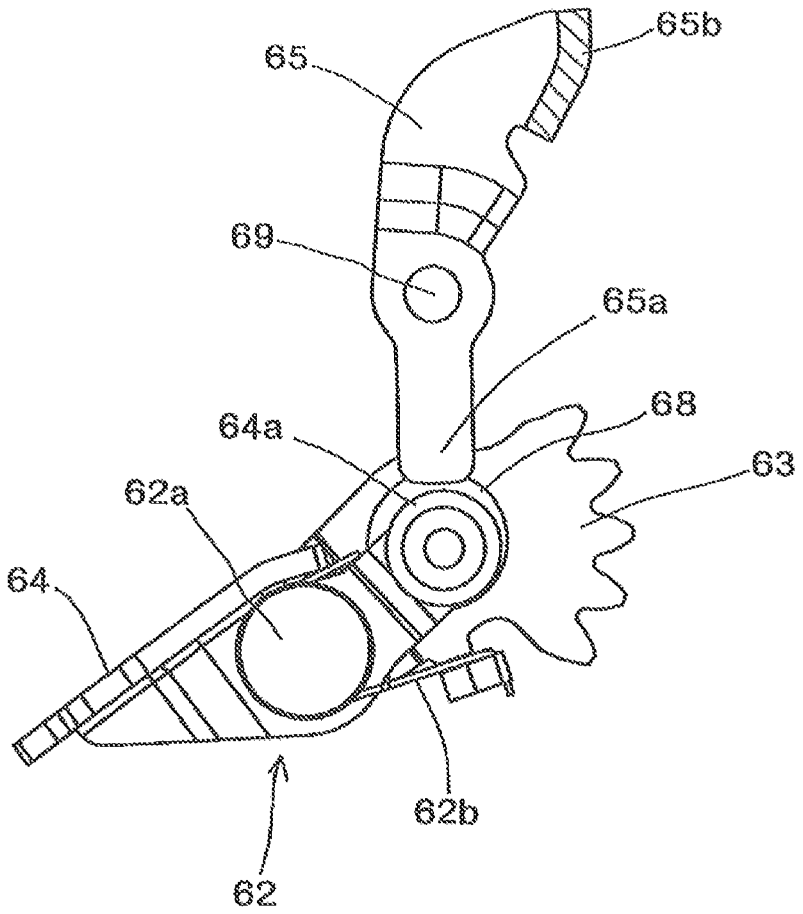
FIG. 5 is a side view of a cancel lever and a closing lever of the operation unit.

FIG. 3 to FIG. 5 illustrate a first embodiment of the operation unit 38. The operation unit 38 includes a first lever 45 that extends in the vertical direction. The first lever 45 is pivotally supported to a housing of the operation unit 38 by a first shaft (common shaft) 46. The first lever 45 includes a coupling arm **45*a* that extends toward the rear, and the tip end of the coupling arm 45*a* is coupled to the ratchet 43** in an operative manner and in a related manner.

In the first embodiment, the first lever 45 is coupled to a safety lock 67 via a cable 48. As is well known, the safety lock 67 is switched between a locked state and an unlocked state. During the unlocked state, when an operating handle (outer handle OH or inner handle IH) is operated, the operation force applied to the operating handle is transmitted to the first lever 45 via the cable 48, and the first lever 45, in FIG. 3, is rotated in the counterclockwise direction (rotated to open the door) about the first shaft 46. However, during the locked state, the operation force applied to the operating handle is not transmitted to the first lever 45. The safety lock 67 is provided in the relay mechanism 20 or the operation unit 38.

When the first lever 45, in FIG. 3, is rotated in the counterclockwise direction (rotated to open the door) about the first shaft 46, the ratchet 43 is rotated in a latch disengaging direction via the coupling arm **45*a*. Consequently, the rear latch unit 37 is unlatched, and the sliding door 12** is switched to a door openable state.

A second lever 49 that is placed so as to overlap with the first lever 45 and that extends in the vertical direction is pivotally supported on the first shaft 46. The second lever 49 is coupled to the operating handle (in general, the outer handle OH and the inner handle IH) via a cable 32. When the outer handle OH or the inner handle IH is operated, the second lever 49, in FIG. 3, is rotated in the counterclockwise direction about the first shaft 46.

The first lever 45 in the first embodiment is coupled to the operating handle via the safety lock 67 and is operatively coupled to the ratchet 43. Alternatively, the second lever 49 in the first embodiment is rotated in the counterclockwise direction without being affected by the safety lock 67, when the outer handle OH or the inner handle IH is operated (in particular, when the handle is operated to open the door). However, the second lever 49 cannot rotate the ratchet 43 in the latch disengaging direction on its own. This relation is similar to the relation indicated in Japanese Patent Application Laid-open No. 2016-030982.

As illustrated in FIG. 1, the present opening and closing device includes a power closing mechanism PC. The power closing mechanism PC is disposed near the lower part of the full-closing rear latch mechanism 17. The motor power of the power closing mechanism PC is transmitted to a closing lever 62 illustrated in FIG. 3 via a deceleration mechanism, a cable, or the like, which is not illustrated. The closing lever 62 is pivotally supported to a housing (not illustrated) of the full-closing rear latch mechanism 17 (operation unit 38) by a second shaft (closing shaft) 68.

The closing lever 62 includes a driven lever 63 rotated by the motor power of the power closing mechanism PC, and a latch driving lever 64. The driven lever 63 is pivotally supported to the housing of the operation unit 38 by the second shaft 68, and is rotated in the clockwise direction in FIG. 3 by the motor power. The latch driving lever 64 is pivotally supported to the driven lever 63 by a coupling shaft 62*a*, and the latch driving lever 64, in FIG. 3, is biased in the counterclockwise rotation direction by a spring 62*b* with respect to the driven lever 63. A roller-shaped contacting part 64*a* is provided on the base end side of the latch driving lever 64.

Above the closing lever 62, a cancel lever 65 is pivotally supported to the housing of the operation unit 38 by a third shaft (cancel shaft) 69. The cancel lever 65 shifts between the coupling position illustrated in FIG. 3, and the cancel position that is rotated in the counterclockwise direction from the state illustrated in FIG. 3. At the coupling position, a supporting part 65*a* at the lower end of the cancel lever 65 faces the roller-shaped contacting part 64*a* of the latch driving lever 64 in the vertical direction, and restricts the upward movement of the contacting part 64*a* (counterclockwise rotation of the latch driving lever 64). The third shaft 69, the first shaft 46, and the second shaft 68 are in parallel with each other.

While the counterclockwise rotation of the latch driving lever 64 is restricted by the contact of the supporting part 65*a* and the contacting part 64*a*, and when the driven lever 63 of the closing lever 62, in FIG. 3, is rotated in the clockwise direction (rotated in the closing direction) about the second shaft 68 by the motor power of the power closing mechanism PC, the latch driving lever 64 pivotally supported to the driven lever 63 by the coupling shaft 62*a* is integrally rotated with the driven lever 63 in the clockwise direction. In other words, the latch driving lever 64 and the driven lever 63, in FIG. 3, are rotated in the clockwise direction as a single closing lever 62.

The latch driving lever 64 is coupled to the latch 41 in a related manner. Thus, when the closing lever 62 (latch driving lever 64) is rotated by the motor power of the power closing mechanism PC, the latch 41 is rotated in the closing direction from the half latched position (or the vicinity thereof) to the fully latched position (overstroke position).

A contacting part 65*b* is formed on the upper part of the cancel lever 65, and a first pressing part 45*b* and a second pressing part 49*a* that project toward the contacting part 65*b* are provided on the upper part of the first lever 45 and the second lever 49, respectively. When the first lever 45 or the second lever 49 is rotated in the counterclockwise direction, the first pressing part 45*b* or the second pressing part 49*a* is brought into contact with the contacting part 65*b*, and the cancel lever 65 in FIG. 3 is moved from the coupling position to the cancel position. When the cancel lever 65 is shifted to the cancel position, the supporting part 65*a* is no longer facing the contacting part 64*a*. Consequently, the coupling rotation of the driven lever 63 and the latch driving lever 64 is released, and the rotation of the latch 41 in the closing direction by the motor power will be cancelled.

Thus, in the first embodiment, when the safety lock 67 is in the unlocked state, by operation of the operating handle (outer handle OH or inner handle IH), the cancel lever 65 can be shifted to the cancel position, via the safety lock 67, the cable 48, and the first lever 45. Hence, it is possible to cancel the rotation of the latch 41 in the closing direction by the motor power.

Moreover, even when the safety lock 67 is in the locked state, the operation force applied to the operating handle (outer handle OH or inner handle IH) is transmitted to the second lever 49 via the cable 32. When the second lever 49 shifts the cancel lever 65 to the cancel position, it is possible to cancel the rotation of the latch 41 in the closing direction by the motor power.

The contacting part 65*b* of the cancel lever 65 to which the first pressing part 45*b* and the second pressing part 49*a* are brought into contact, is a non-flat reinforced surface having a strong resistance against the pressing force applied from the first pressing part 45*b* and the second pressing part 49*a* by being curved or bent. A part of the reinforced surface may be curved or bent, or the entire reinforced surface may be curved. In the embodiment, the first pressing part 45*b* and the second pressing part 49*a* are brought into contact with the curving surface or the bending surface, after being brought into contact with the flat part of the contacting part 65*b*.

The contacting part 65*b* is curved or bent without reducing the operability. This design is possible because the cancel lever 65 is pivotally supported on the third shaft 69 different from the first shaft 46 to which the first lever 45 and the second lever 49 are pivotally supported.

It is preferable that the first pressing part 45*b* and the second pressing part 49*a* are placed at the same distance from the first shaft 46. The first pressing part 45*b* and the second pressing part 49*a* of the first lever 45 and the second lever 49 that are overlapped with each other are brought into contact with the contacting part 65*b* at two different height positions, in the height direction of the contacting part 65*b* (axis direction of the third shaft 69). However, the first pressing part 45*b* and the second pressing part 49*a* are brought into contact with the contacting part 65*b* at the same length position, in the length direction of the contacting part 65*b*. This is because the contacting part 65*b* is formed on a non-flat reinforced surface having a strong resistance against the pressing force applied from the first pressing part 45*b* and the second pressing part 49*a*.

Figure 6:
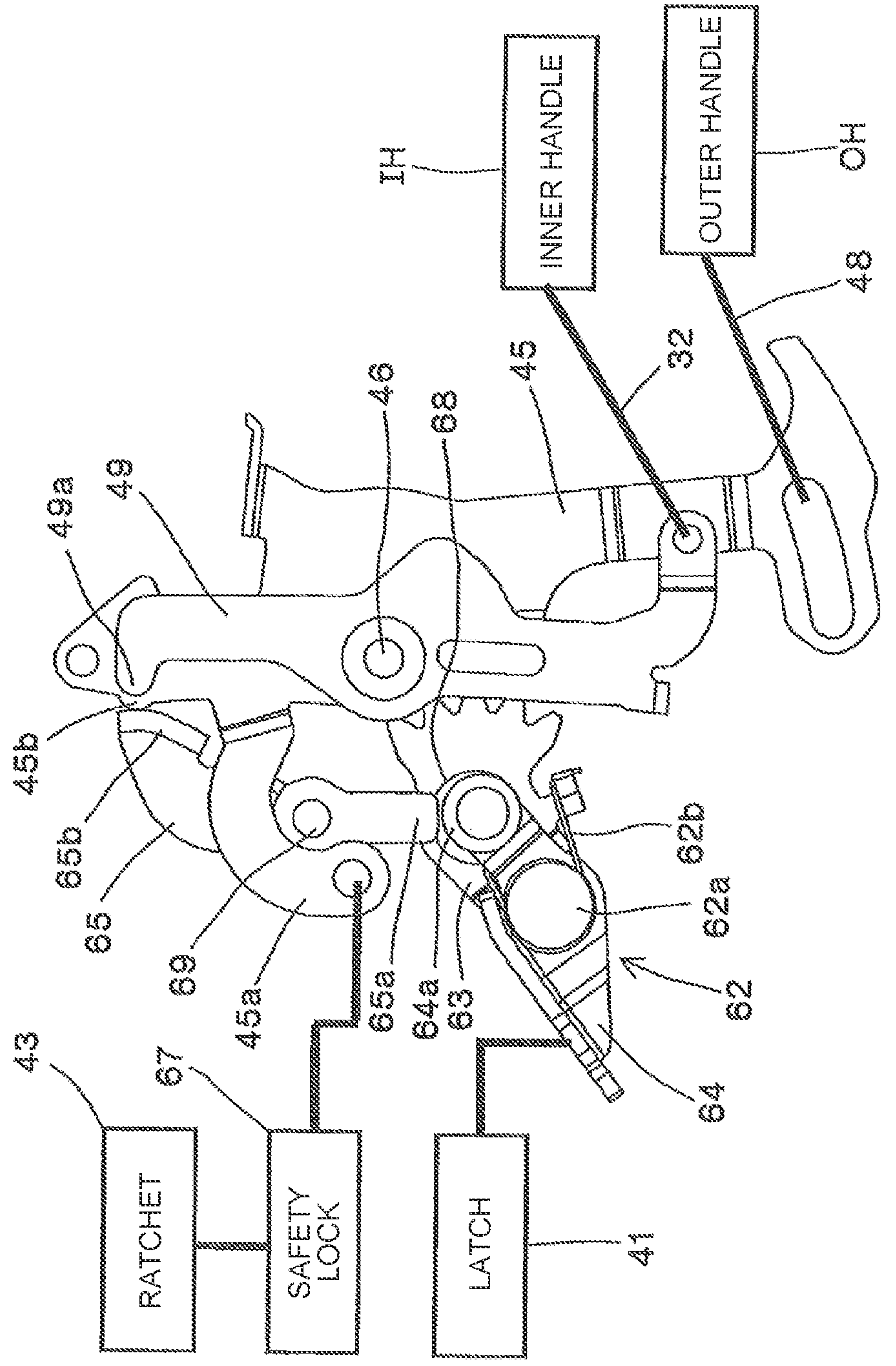
FIG. 6 is a side view illustrating an internal structure of an exterior side of an operation unit of a second embodiment.

FIG. 6 illustrates a second embodiment of the operation unit 38. In the second embodiment, the positional relation and the coupling relation are changed. Basically, the same reference numerals as those in the first embodiment are used.

In the second embodiment, the safety lock 67 is placed between the coupling arm 45*a* of the first lever 45 and the ratchet 43. The first lever 45 is operatively coupled to the outer handle OH, and the second lever 49 is operatively coupled to the inner handle IH.

In the second embodiment, when the outer handle OH is operated, the first lever 45 is rotated in the counterclockwise direction. When the safety lock 67 is in the unlocked state, the ratchet 43 is rotated in the latch disengaging direction, and the cancel lever 65 is moved to the cancel position. When the safety lock 67 is in the locked state, the ratchet 43 does not rotate, and the cancel lever 65 is moved to the cancel position.

When the inner handle IH is operated, the second lever 49 is rotated in the counterclockwise direction, and the cancel lever 65 is moved to the cancel position. However, the ratchet 43 is not released. To release the ratchet 43, it is preferable to couple the inner handle IH and the outer handle OH via a child safety lock.

Figure 7:
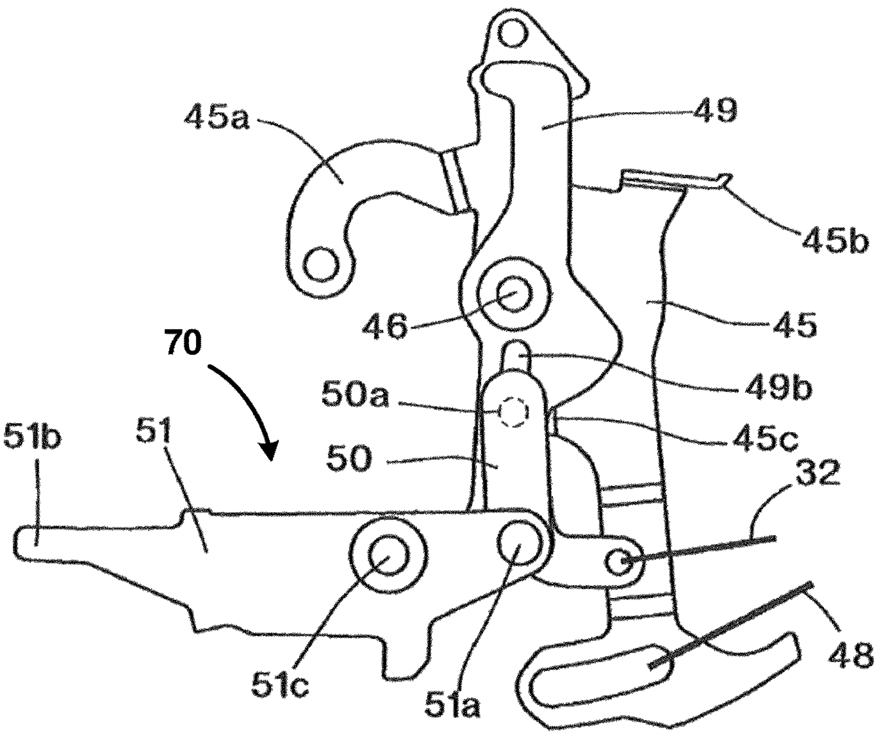
FIG. 7 is a side view illustrating a child safety lock of the operation unit of the second embodiment.

FIG. 7 illustrates a child safety lock 70 to be added in the second embodiment.

A slot 49*b* is provided in the second lever 49, and a child pin 50*a* of a child link 50 is inserted into the slot 49*b*. The child pin 50*a* moves with the rotation of the second lever 49 in the counterclockwise direction (FIG. 7), is brought into contact with an engagement part 45*c* of the first lever 45, and rotates the first lever 45 to open the door. Consequently, it is possible to rotate the ratchet 43 in the latch disengaging direction.

The child link 50 is coupled to a child lever 51 by a pin 51*a*. An operation knob 51*b* at the tip end of the child lever 51 is exposed to the outside of the sliding door 12 from the vicinity of the rear latch unit 37. In other words, because the operation knob 51*b* is exposed from the rear end surface of the sliding door 12, it is possible to effectively prevent the operation knob 51*b* from being operated improperly.

When the operation knob 51*b* is operated toward the child lock side, the child lever 51, in FIG. 7, is rotated in the counterclockwise direction about a child shaft 51*c*. Consequently, the child pin 50*a* is moved to the upper side of the slot 49*b*. Thus, the child pin 50*a* is no longer facing the engagement part 45*c* (child lock state), and the rotation of the second lever 49 to open the door will not be transmitted to the first lever 45.

Figure 8:
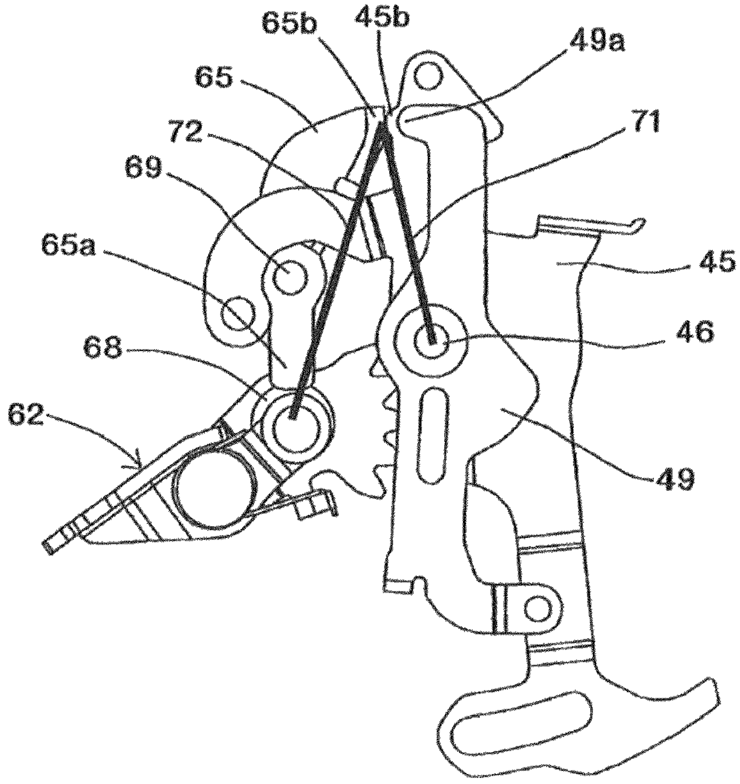
FIG. 8 is a diagram for explaining a first line segment that connects a common shaft with a contacting part, and a second line segment that connects a closing shaft with a contacting part.

In the first embodiment and the second embodiment, a first line segment 71 connects the common shaft 46 that pivotally supports the first lever 45 and the second lever 49 with the contacting part 65*b* of the cancel lever 65, and a second line segment 72 connects the closing shaft 68 that pivotally supports the closing lever 62 with the contacting part 65*b* of the cancel lever 65. The first line segment 71 and the second line segment 72 bend like a V-shape (inverted V-shape) as illustrated in FIG. 8. Consequently, compared to the conventional configuration, the present device can be formed in a compact manner. Moreover, due to the inverted V-shape, the contacting part 65*b* of the cancel lever 65 may be formed in a curved surface or a bent surface having improved strength against the flat contacting part, without reducing the operability.

In the present disclosure, the contacting part 65*b* of the cancel lever 65 to which the first lever 45 and the second lever 49 are brought into contact is formed into a reinforced contacting part. Thus, the first pressing part 45*b* and the second pressing part 49*a* of the first lever 45 and the second lever 49 can be brought into contact with the contacting part 65*b* at the same length position in the length direction, although the first pressing part 45*b* and the second pressing part 49*a* are brought into contact with the contacting part 65*b* at different positions in the height direction. Consequently, it is possible to improve the operability.

In the present disclosure, the first line segment 71 and the second line segment 72 are disposed so as to form a V-shape (including an inverted V-shape). Consequently, it is possible to reduce the size.

In the present disclosure, it is possible to couple the device to the safety lock 67 and the operating handle as in the conventional configuration.

In the present disclosure, the first lever 45 and the second lever 49 can be separately coupled to the outer handle OH and the inner handle IH without being affected by the safety lock 67. Consequently, it is possible to arrange the coupling cables in an improved manner.

In the present disclosure, the child safety lock 70 can be installed with the safety lock 67. Consequently, it is possible to obtain a compact design.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An opening and closing device for a vehicle sliding door, comprising:
- a latch configured to engage with a striker provided on a vehicle body;
- a ratchet configured to engage with the latch so as to maintain engagement of the latch with the striker;
- a power closer including a motor;
- a closing lever configured to rotate the latch in a closing direction from a half latched position to a fully latched position, by being rotated by motor power of the power closer;
- a cancel lever configured to shift between:
  - a coupling position where rotation of the closing lever is transmitted to the latch; and
  - a cancel position where rotation of the closing lever is not transmitted to the latch; and
- a first lever and a second lever, each of the first lever and the second lever being configured to move the cancel lever from the coupling position to the cancel position by operation of an operating handle of a sliding door, the operating handle comprising at least one of an outer handle or an inner handle, wherein
- the cancel lever includes a non-flat reinforced contacting part with which the first lever and the second lever are independently configured to be brought into contact,
- the first lever and the second lever are pivotally supported on a common shaft,
- the cancel lever is pivotally supported on a cancel shaft different from the common shaft, and
- the common shaft and the cancel shaft are in parallel with each other.

2. The device according to claim 1, wherein
- the closing lever is pivotally supported on a closing shaft different from the common shaft, and
- a first line segment that connects the reinforced contacting part with the common shaft and a second line segment that connects the reinforced contacting part with the closing shaft are provided so as to form a V-shape.

3. The device according to claim 2, wherein
- the operating handle includes the outer handle and the inner handle,
- the first lever is coupled to one of the outer handle or the inner handle via a safety lock, and the ratchet is rotated in a latch disengaging direction by operation of the operating handle, and
- the second lever is coupled to one of the outer handle or the inner handle not via the safety lock.

4. The device according to claim 2, wherein
- the operating handle includes the outer handle and the inner handle,
- the first lever is coupled to the outer handle,
- the second lever is coupled to the inner handle, and
- the first lever is configured to rotate the ratchet in a latch disengaging direction via a safety lock.

5. The device according to claim 4, wherein the inner handle and the outer handle are operatively coupled to each other via a child safety lock.

6. The device according to claim 1, wherein
the operating handle includes the outer handle and the inner handle,
the first lever is coupled to one of the outer handle or the inner handle via a safety lock, and the ratchet is rotated in a latch disengaging direction by operation of the operating handle, and
the second lever is coupled to one of the outer handle or the inner handle not via the safety lock.

7. The device according to claim 1, wherein
the operating handle includes the outer handle and the inner handle,
the first lever is coupled to the outer handle,
the second lever is coupled to the inner handle, and
the first lever is configured to rotate the ratchet in a latch disengaging direction via a safety lock.

8. The device according to claim 7, wherein the inner handle and the outer handle are operatively coupled to each other via a child safety lock.

* * * * *